United States Patent Office 3,202,563
Patented Aug. 24, 1965

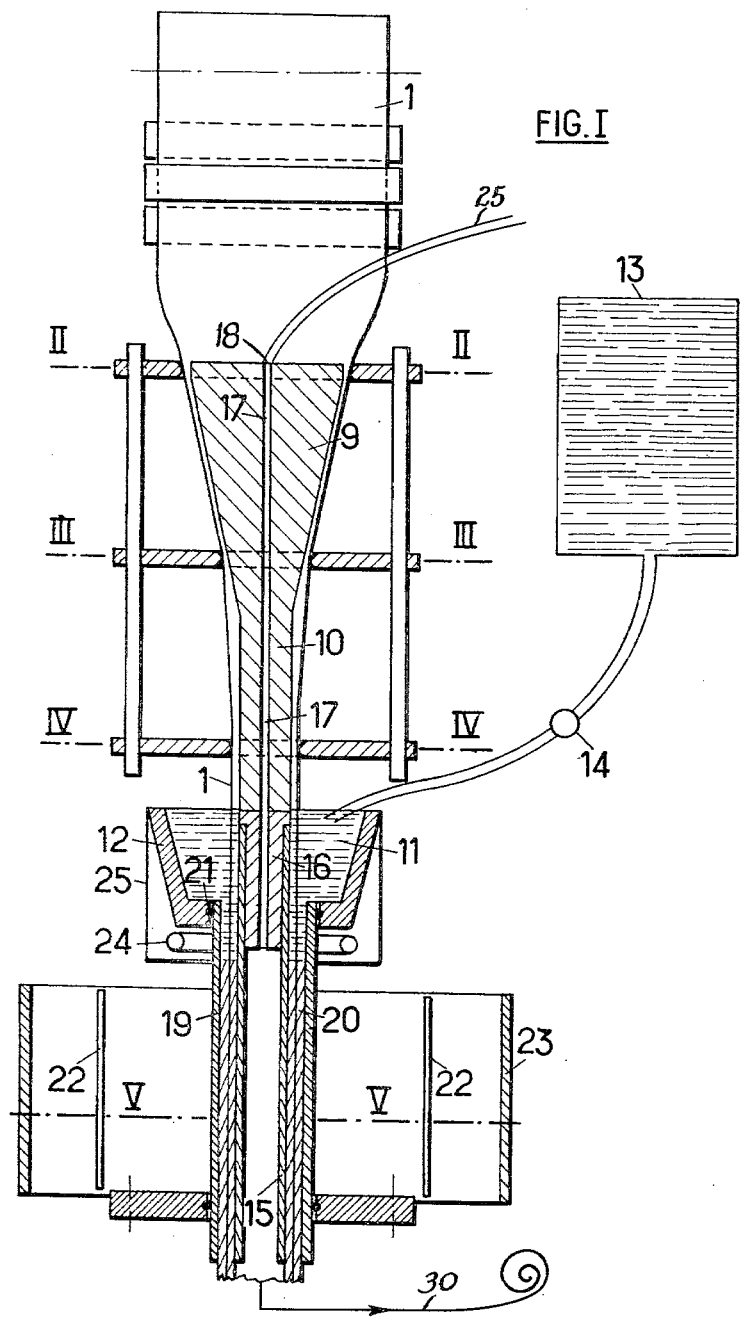

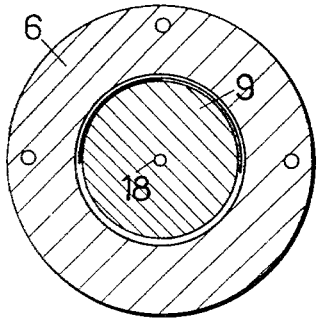
FIG. II
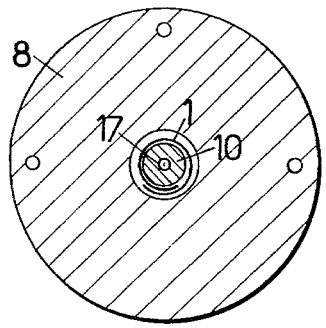
FIG. IV
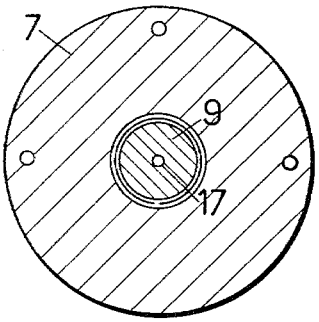
FIG. III
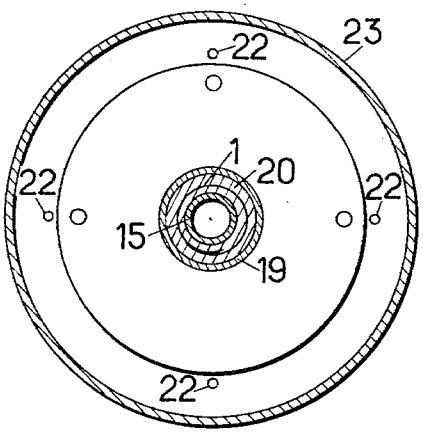
FIG. V

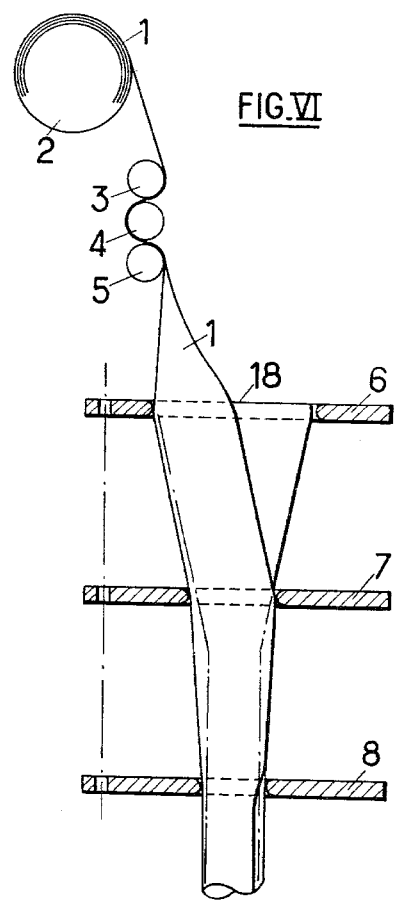
FIG. VI

3,202,563
APPARATUS FOR MAKING REINFORCED
FLEXIBLE TUBING
Joseph Charvet, Paris, France, assignor to Societe à responsabilite Limitee: Tuyaux Flexibles Rudolph, Paris, France
Filed May 28, 1962, Ser. No. 198,154
Claims priority, application Belgium, June 2, 1961, 604,544
11 Claims. (Cl. 156—466)

This invention relates to the continuous manufacture of flexible pipes of synthetic or natural material having a reinforcement which is generally textile.

Hitherto, continuous manufacture has been effected from a reinforcement woven on a circular loom which, directly after leaving the circular loom, passes through external and/or internal baths of synthetic or natural material.

These processes have the disadvantage of being linked with the operation of the circular loom, the speed of which is limited, on the one hand, and the incidents in operation of which, on the other hand, have a detrimental effect on all stages of manufacture following on the loom.

The present invention has as its object a process and a device insuring independence with respect to the loom and making possible, for obvious reasons which will become apparent hereunder, substantially higher speeds.

According to the new process and with the new device, one starts from a flat strip of a textile fabric or of other deformable material of indefinite length and, while it is being subjected to a movement of translation, deforms it progressively by guiding until one obtains a surface, the cross-section of which is circular and having an overlap, to a greater or lesser extent, of the edges by superimposing them.

This process and device for the pre-forming of a tubular reinforcement or core may therefore be carried into effect in combination with any of the coating devices already known located after the circular loom.

Moreover, the new process offers the advantage of permitting a feed in the vertical, downward direction, the primary asset of which is to facilitate the evacuation of the water of synaeresis.

The result of this arrangement is that one may if desired, owing to the fact that the reinforcement is subjected to less stresses, use reinforcements having a relatively loose texture, through which it is easy for the liquid material to pass. It follows that the process lends itself just as well to the production of articles known as stratified, that is to say in which the reinforcement is immersed in a homogeneous material layer, as to the obtaining of coating products, that is to say products in which the reinforcement is covered on each of its two faces with a layer of coating material which is held by adherence.

The new process may be applied just as well with natural latex as with synthetic latex.

One example of carrying the invention into effect will be given hereunder, without the applicants intending, however, to limit the generic scope of this invention to the specific features of the example chosen for illustration.

In the accompanying drawings:
FIGURE 1 shows very diagrammatically a view of the device in axial vertical section.
FIGURES 2, 3, 4, 5 are horizontal sections along the lines II—II, III—III, IV—IV and V—V respectively, of FIGURE 1.
FIGURE 6 is a partial axial section through a plane perpendicular to the plane of section of FIGURE 1.

The reinforcement or sheath 1, which may be of textile or metal material or any other deformable material is in the form of a flat strip, of suitable width, wound into the cylinder 2, from where it unwinds, being guided by the rollers 3, 4, 5 which regulate the tension and perform the function of a brake. On leaving this guide, the reinforcement passes through forming guides 6, 7, 8 which are in the form of circular deflectors, in combination with a central guide having the form of a frustrum at 9, extended by a cylindrical portion at 10, the whole assembly being designed to leave between the guides 6, 7, 8, on the one hand, and the forming guides 9, 10, on the other hand, an annular space sufficient to allow the free passage of the reinforcement 1.

Thus guided and deformed so as to have a form of circular section with overlapping of the edges to a greater or lesser extent, the reinforcement is ready to be subjected to any internal and/or external coating by known means, and the ensuing description of the coating device is to be considered merely as one of the possible methods, although in itself it is absolutely new and constitutes an invention per se.

In the present example, the reinforcement is propelled in a vertical downward direction, which is practically impossible when the manufacture is directly combined with a circular loom.

The reinforcement, having received its tubular form, enters the bath 11 of natural or synthetic latex, which is kept at a constant level in a vat 12, into which it is admitted at a temperature of 20°, for example, from the supply tank 13. The device for keeping the level constant has not been shown, as it may be of any nature and does not come within the scope of the invention, the simplest method naturally being to check and regulate the admission manually by a valve indicated diagrammatically at 14. Through the bottom of the vat 12 passes a vertical tube 15 which may be, for example, of enamelled metal, but which is preferably made of glass of the type known under the name of Pyrex. The upped end of the tube 15 caps the extension 16 of the portion 10 of the forming guide 9, so that the outer surface of the tube 15 extends without a break into the outer surface of the guide 10.

The guides 9, 10, 16 preferably have passing through them an internal channel 17, through which hot air is blown through at 18, by means of a pipeline 25. In this case, the extension portion 16, which is below the free level of the bath 11 will preferably be of a material which is a bad conductor of heat. The tube 15 is placed inside a coaxial tube 19 of the same material so as to form between them an annular space corresponding to the desired thickness for the layer 20 of synthetic or natural material in which the reinforcement 1 is being immersed.

The tube 19 enters the bottom of the vat 12 and fluid-tightness is ensured by any suitable means, for example by the toric joint 21.

The liquid latex of the bath 11 may therefore enter by gravity and flow through the annular space between the two tubes 15 and 19. The reinforcement 1, which likewise enters this annular space, through which it passes in its movement of translation, is assumed to be loose enough for the liquid to pass through it easily, thus constituting a single liquid layer, in which the reinforcement 1 is immersed.

The jellification in the case of natural latex is produced by thermal action and in the case of synthetic latex it is likewise facilitated by thermal action. To this end, there are arranged around the tube 15 infra-red transmitting lamps or radiators designated 22 in the drawings and located inside a cylindrical reflecting surface 23, these lamps being sufficient in number to obtain a temperature of the order of 80° for example in the annular space between the two tubes 15 and 19.

To avoid the transmission of heat to the bath 11, there could be provided a circulation of cooling brine in the toric tube 24, which may be arranged in a vat 25, in which the vat 12 as well as the upper part of the tube 19 is immersed.

As has been stated, the action of the infra-red rays may by supplemented by an internal blast of hot air.

At the outlet of the tubes 15 and 19, the reinforced pipe thus obtained passes in the usual manner through a drying oven, not shown, to complete the drying and vulcanization.

Following this oven are the usual traction and winding means indicated schematically at 30 which effect the continuous propulsion of the reinforcement through the entire manufacturing device up to and including the unwinding of the reinforcement 1 from the roller 2. Such a device is shown in the patent to Anthony P. Hinsky Number 864,168, issued August 27, 1907.

The functioning of the device has already been described with the description of the device itself.

In the example which has been given a so-called stratified product has been obtained.

The invention which consists substantially in the process for forming the tubular reinforcement, may be applied by directing the movement of translation vertically upward. As long as the reinforcement is formed tubularly, it then becomes possible to apply all the covering precesses either by coating or by immersion which are known at present and have hitherto been applied after the circular loom.

By way of example to carry out a coating operation, it is sufficient to provide at the outlet of the vat 12, the devices provided when working with reinforcements which do not allow the liquid to pass through them easily. For example, one may use the devices described in British Patent No. 884,773, which makes it possible to obtain the inner and outer covering by coating.

What I claim is:

1. Apparatus for manufacturing reinforced flexible tubing in which a tubular reinforcement is obtained from a flat sheet which is continuously supplied and progressively deformed until it has a circular cross-section and is thereafter passed through at least one bath of a material susceptible of furnishing an outer coating for said tubular reinforcement, said apparatus comprising in combination,
   a central guide in the form of a cone having a vertically disposed axis,
   and at least two spaced annular guides around said conical guide and disposed to provide between said annular guides and said conical guide an annular space allowing the passage of said sheet,
   and conventional means for advancing said tubular reinforcement in the direction of said vertical axis formed by said sheet.

2. Apparatus as defined in claim 1 wherein said conical guide has its apex directed downwardly and said advancing means move said tubular reinforcement from top to bottom.

3. Apparatus as defined in claim 1 wherein said conical guide has a coaxial guide extension below its apex.

4. Apparatus as defined in claim 3 including a vat for receiving a liquid composition and disposed below said conical guide.

5. Apparatus according to claim 2 wherein said cone has a coaxial extension directed downwardly, that a vat for receiving a liquid composition is disposed below said conical guide and that said guide extension penetrates into said vat.

6. Apparatus according to claim 5 wherein said vat has a bottom provided with an opening and that said guide extension traverses said opening.

7. Apparatus according to claim 6 including a cylindrical member constituting a continuation of said guide extension and having the same outer diameter, a cylindrical guide connected to said vat and surrounding said cylindrical member to form an annular space between said guide extension and said cylindrical member permitting the passage of said tubular reinforcement.

8. Apparatus as defined in claim 7 including thermal means for heating said liquid composition in the lower portion of said annular space.

9. Apparatus as defined in claim 8 wherein said thermal means consist of infrared radiators.

10. Apparatus as defined in claim 1 including means for introducing hot air axially downwardly through said conical guide and said guide extension into said coated tubular reinforcement at the level at which jellification is to be initiated.

11. Apparatus as defined in claim 10 wherein said means for introducing hot air comprise an axial channel provided in said conical guide and in said guide extension.

References Cited by the Examiner

UNITED STATES PATENTS

| | | | |
|---|---|---|---|
| 864,168 | 8/07 | Hinsky | 156—393 |
| 1,327,677 | 1/20 | Kennedy | 156—393 |
| 2,912,043 | 11/59 | Bargholtz et al. | 156—466 XR |
| 2,934,130 | 4/60 | Lane et al. | 156—466 XR |

EARL M. BERGERT, *Primary Examiner.*